Patented July 16, 1935

2,008,188

UNITED STATES PATENT OFFICE 2,008,188

METHOD OF REFINING ALUMINUM

Jacob J. Ripner, Cleveland Heights, Ohio

No Drawing. Application August 18, 1933,
Serial No. 685,725

11 Claims. (Cl. 75—58)

This invention relates to the art of refining aluminum and to refined aluminum.

Secondary or scrap aluminum contains dirt, materials incorporated by previous fluxing operations, oxides and other sonims which impair the usefulness of the metal. Heretofore, it has been usual to employ secondary aluminum, in small proportion, with virgin aluminum so that the defects inherent in such metal will not be of undesirable magnitude in the finished product. It is an object of this invention to provide a novel method of refining secondary aluminum, and the product resulting therefrom, which will eliminate impurities to a degree such that the metal can be used as virgin aluminum is used.

Commercial aluminum contains small percentages of other elements such as iron, copper, nickel and silicon, and is an alloy with those substances. The combination between the metals is not a complete one as is shown by the drag surface of a heavy casting where a granular and needle-like crystalline structure, caused by the settling of the iron, appears. It is an object of this invention to provide a process, and the product made therefrom, which affords a better combination of the metals as evidenced by the substantial absence of any granular or needle-like structure at the drag surface of heavy castings.

While this invention is especially adapted for refining secondary aluminum because of the elimination of sonims, yet the process of this invention may be practised with virgin aluminum, better combination between the metals present resulting and an improved product attained.

In the past it has been common to treat secondary aluminum by melting the scrap in open pot furnaces or in reverberatory furnaces according to the quantity of metal to be melted; the metal being introduced, puddled and fluxed in ways determined largely by the size of the pieces or particles, the dirt, oxides, and foreign materials present. Such a treatment is carried on at slightly above melting temperature. Purification is attempted by fluxing in one or another of the conventional methods. The metal produced in this manner, unless the scrap aluminum be of extraordinary quality, is unfit for any use other than with virgin aluminum and only in small proportions.

According to this invention secondary aluminum, which commonly contains small percentages of iron, copper, nickel, manganese, and silicon and combinations thereof, in any form, large castings or fine turnings, containing the usual dirt, oxide and foreign materials may be treated, after passing through the usual mechanical separating process, by melting at ordinary pouring temperatures, and fluxing according to common practice. Zinc chloride or cryolite flux is satisfactory. Up to that point this process follows conventional practice. The melted, fluxed, skimmed metal is then poured into the pot of a reverberatory furnace. According to previously known practice, high temperatures and oxidizing furnace atmospheres are necessarily to be avoided so as not to oxidize the metal. According to this invention, the molten metal in the reverberatory furnace is heated in an oxidizing or neutral atmosphere to a high temperature. While the invention may be practised in a furnace having any conventional type of heating element, an open oil flame over the surface of the metal has been found satisfactory in practice. In order to obtain an oxidizing atmosphere an excess of air is provided in the furnace atmosphere and, where combustion takes place in that atmosphere, the excess of air may be provided by a blower which throws the greatest possible volume of air into the combustion chamber. The metal is exposed to the oxidizing atmosphere. The metal is heated from the temperature at which it is poured into the furnace to a temperature approximately within the range 1900° to 1950° F. This heating operation may require approximately one hour to one and one half hours according to the quantity of metal, the condition and capacity of the furnace. When the temperature reaches the desired temperature it may be held at that temperature for a suitable time; e. g. a few minutes. The metal may be skimmed from time to time while it is being heated. While a neutral atmosphere may be used in practising this invention, the difficulty of maintaining such an atmosphere makes it desirable to provide an oxidizing atmosphere. In the claims the term neutral to oxidizing is a coined phrase to express a condition which may range from neutral through various degrees of excess oxygen in the furnace atmosphere.

The heated metal may then be poured out into holding pots, not heated, where it cools gradually. Graphite pots are suitable for this purpose. The metal may be allowed to stand in the pots for some time; cooling of the metal may be hastened by casting ingots of the hot metal, iron molds being desirable for the purpose, and returning the solid ingots to the pot. The metal is skimmed from time to time as necessary. When the metal is cooled to a suitable pouring temperature, it may be cast as ingots, to be used as virgin aluminum is used or it may be poured directly into molds for casting articles.

The resulting product is aluminum of quality comparable with virgin metal and which can be used alone for the manufacture of aluminum products just as the virgin metals would be used.

A distinguishing physical characteristic of the aluminum, refined according to the practice of this invention, is the substantially complete absence of granular or needle-like crystalline structure on the drag surface of heavy castings such as ingots. The metal is highly uniform throughout heavy castings.

The practice of this invention is not limited to any particular kind of secondary aluminum nor is it limited to secondary aluminum. No particular type of furnace is essential to the practice of this invention so long as sufficiently high temperatures may be obtained and an oxidizing atmosphere afforded. The process is not critical with respect to any of the time periods involved. The manner of cooling the metal is not limited to that described. The range of the percentages of oxygen present in the atmosphere to which the metal is exposed is not limited to other than reasonable percentages, such for example as the maximum obtainable by blowing as much excess air into the furnace as practicable. Any percentage of oxygen from such an upper limit to neutral may be used, a large excess of oxygen being desirable in order to insure a constantly oxidizing atmosphere. The temperature found to be most effective, to which the aluminum should be heated, is approximately 1900° to 1950° F. as nearly as it is practicable to regulate the ordinary commercial furnace and as nearly as it is practicable to determine such temperatures with ordinary pyrometers under practical working conditions.

However, this invention may be practiced successfully by heating the aluminum to any temperature with the range 1800° to 2000° F. and in the broadest aspect, it is intended to include such practices within the scope of this invention. It may be necessary to hold the aluminum a considerable length of time at 1800° in order to attain a uniform temperature throughout the body of molten metal and thus to effect the desired improvement in the quality of the aluminum and care must be taken when heating in the neighborhood of 2000° F. not to burn the aluminum. The time, one hour to one and one-half hours for heating the aluminum, represents adequate time for heating the aluminum to a substantially uniform temperature throughout the whole mass of metal.

This invention is useful in refining aluminum alloys of various kinds where the proportion of aluminum present is sufficient or more than sufficient to form a eutectic alloy. The term aluminum as used in this description and in the claims is intended to cover all such alloys as well as what is known as commercially pure aluminum.

While the invention has been described in detail by way of illustration it is not intended so to limit the invention inasmuch as variations in the steps involved and the equipment used in practising the invention may be made as will be apparent to one skilled in the art without departing from the spirit and scope of the invention as defined in the following claims.

Having described the invention what I claim as my invention is as follows:

1. The process of refining aluminum which comprises melting the aluminum, fluxing and skimming the melted aluminum heating the aluminum to approximately 1900° to 1950° F. cooling and casting the aluminum.

2. The process of refining aluminum which comprises melting and fluxing the aluminum, heating the melted aluminum in a neutral to oxidizing atmosphere to approximately 1900° to 1950° F. cooling and casting the aluminum.

3. The process of refining aluminum which comprises melting, fluxing and skimming secondary aluminum, heating the melted aluminum with the surface exposed to an oxidizing atmosphere over a period of approximately one hour to one and one half hours until a temperature of 1900° to 1950° F. is reached, pouring the heated aluminum into holding pots, gradually cooling to a suitable pouring temperature and casting.

4. In the art of aluminum refining, the step of: heating aluminum to 1900° to 1950° F. approximately.

5. In the art of aluminum refining, the steps of: heating aluminum to 1900° to 1950° F. approximately and exposing the surface of the aluminum to a neutral to oxidizing atmosphere while being heated.

6. In the art of aluminum refining, the steps of; heating aluminum with the surface exposed to the combustion atmosphere of a furnace, said atmosphere being an oxidizing atmosphere, said heating being carried out for one hour to one and one half hours, the aluminum being heated to 1900° to 1950° F. approximately.

7. In the art of aluminum refining, the steps of; heating aluminum to 1900° to 1950° F. approximately with the surface of the aluminum exposed to an oxidizing combustion atmosphere in the furnace, pouring the metal into holding pots and allowing the metal to cool gradually.

8. In the art of aluminum refining, the steps of; heating aluminum to 1900° to 1950° F. approximately over a period of one hour to one and one half hours, with the surface of the aluminum exposed to a neutral to oxidizing atmosphere in the furnace, pouring the metal into holding pots and allowing the metal to cool gradually.

9. In the art of aluminum refining the steps of; heating aluminum to a temperature within the range 1800° to 2000° F. while exposing the aluminum to an oxidizing atmosphere.

10. In the art of aluminum refining the steps of; heating aluminum to a temperature within the range 1800° to 2000° F. while exposing the aluminum to a neutral to oxidizing atmosphere.

11. In the art of aluminum refining the steps of; heating aluminum to a temperature within the range 1800° to 2000° F. while exposing the surface of the aluminum to the combustion atmosphere of a furnace, said atmosphere being an oxidizing atmosphere.

JACOB J. RIPNER.